M. A. FESLER.
LUBRICATING DEVICE FOR SHAFT BEARINGS.
APPLICATION FILED APR. 10, 1918.

1,370,803.

Patented Mar. 8, 1921.

Inventor
Milton A. Fesler
by
Robt. O. Hains,
Attorney

UNITED STATES PATENT OFFICE.

MILTON A. FESLER, OF OAKLAND, CALIFORNIA, ASSIGNOR, BY MESNE ASSIGNMENTS, TO PETROLEUM HEAT AND POWER COMPANY, A CORPORATION OF DELAWARE.

LUBRICATING DEVICE FOR SHAFT-BEARINGS.

1,370,803.   Specification of Letters Patent.   Patented Mar. 8, 1921.

Application filed April 10, 1918. Serial No. 227,658.

*To all whom it may concern:*

Be it known that I, MILTON A. FESLER, a citizen of the United States, residing at Oakland, county of Alameda, and State of California, have invented an Improvement in Lubricating Devices for Shaft-Bearings, of which the following description, in connection with the accompanying drawings, is a specification, like characters on the drawings representing like parts.

The invention hereiafter described relates to lubricating devices for the bearings of shafts for electric motors, dynamos and other purposes.

Heretofore lubricating devices for electric motors and dynamos have been found to be objectionable for various reasons. Among others, there has been no adequate provision for preventing the lubricant from working in from the bearings along the shaft into the casing of the machine to the internal working parts thereof, where it dries, cakes, collects dirt and clogs and injures said parts. One of the objects of the present invention is to provide simple and effective means for effectively preventing the lubricant from escape from the bearings to the interior of the casing and external parts of the machine.

Another object of the present invention is to provide a construction whereby water is prevented from entering the casing of the machine, thereby protecting the same from injury from flooding, and enabling the same to be used under water if desired.

Another object is to provide a device, the parts of which are simple and cheap in construction, easily assembled, and readily accessible for purposes of cleaning, replacement and repair.

And still another object is to provide a simple device whereby lubricant can be readily supplied to a plurality of bearings.

With the aforesaid and other objects in view, the character of the invention will be best understood by reference to the following description of one good form thereof shown in the accompanying drawing, wherein:—

Figure 1:
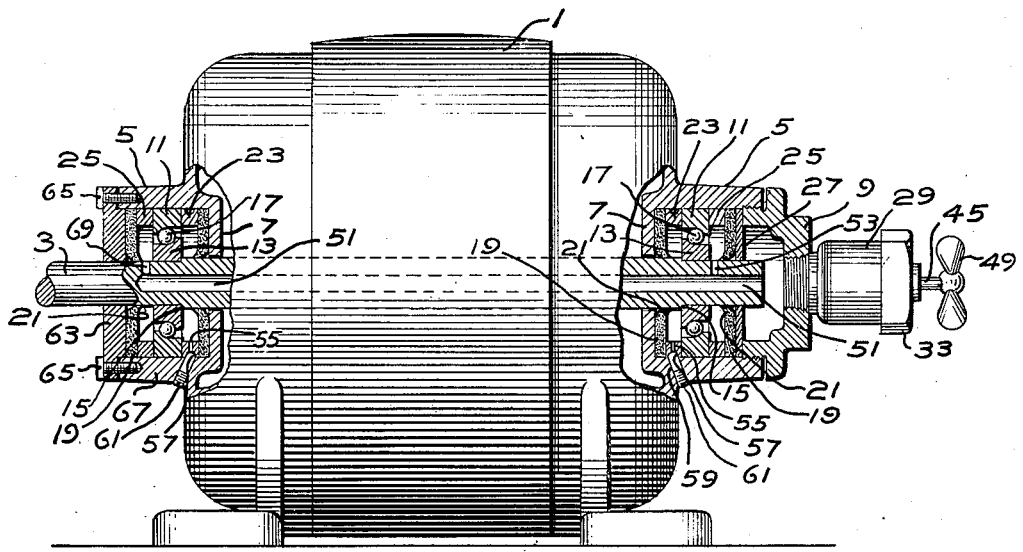
Figure 2:
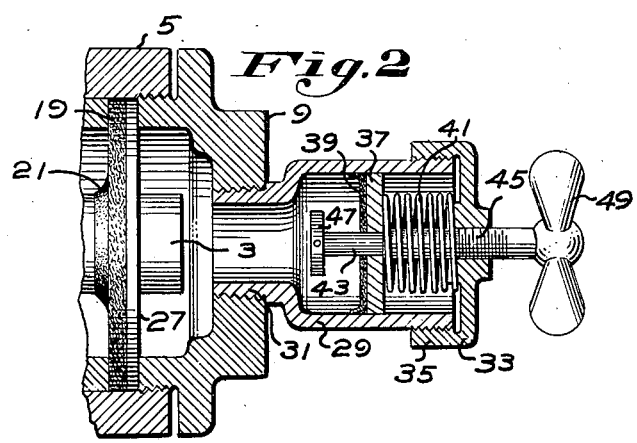

Figure 1 is a view partly in elevation and partly in section of an electric motor equipped with lubricating devices embodying the invention; and Fig. 2 on an enlarged scale is a vertical section through a portion of one of the devices showing the lubricant supply cylinder therefor.

The invention will be described as applied to an electric motor, but it will be understood that it is susceptible of other applications as desired.

In the drawing, 1 (Fig. 1) designates an electric motor which may be of usual construction well known in the art, and therefore, it is unnecessary to show and describe the same in detail herein. The motor may be provided with an armature shaft 3 journaled in bearings at the opposite ends of the motor casing. Since these bearings are similar in the main, a description of one will suffice largely for both.

In the present instance, the motor casing is provided with a journal box conveniently in the form of a boss 5 projecting outward from the casing, and having an inner end or flange 7 apertured to receive the shaft, and an outer end conveniently in the form of a head 9 threaded to said boss.

A ball bearing may be provided in said journal box comprising a ring 11 fitted into the boss 5 and a conical ring 13 fitting a reduced end of the shaft 3 and engaging a shoulder 15 formed thereon. Usual bearing balls 17 are interposed between the rings 11 and 13.

Rings or disks 19 of leather or other equivalent flexible material may be fitted into the box and in the present instance are located at opposite sides of the ball bearing. These rings have inturned circumferential portions or flanges 21 which intimately engage the shaft and prevent leakage between them. Preferably these leather rings are spaced a substantial distance from the ball bearing to furnish a sufficient chamber to accommodate the lubricant for the bearing. For this purpose spacing rings 23 and 25 may be provided fitting into the boss 5 and having an internal diameter substantially larger than the shaft. A cover plate 27 may be fitted into the boss over an end of the shaft and engage the outer leather ring.

The construction is such that the head 9 when screwed into the boss, will press the leather rings, spacing rings, bearing ring 11 and cover plate 27 toward the inner end of the journal box and confine said parts against relative movement axially of the shaft.

Suitable means may be provided to supply lubricant to the bearing in the chamber between the leather rings. To accomplish this, in the present instance, a reservoir may be provided conveniently in the form of a cylinder 29 (Figs. 1 and 2) having a neck 31 threaded into the head 9, referred to, and a cap 33 provided with a flange 35 threaded to the outer end of the cylinder. Fitted in the cylinder is a piston or plunger 37 having a cupped leather facing 39 for preventing leakage past the piston. To automatically feed the lubricant from the cylinder, a helical spring 41 may be interposed between the piston 37 and the cap 33. Suitable means may be provided to withdraw the piston from the cylinder to allow filling thereof. To accomplish this, in the present instance, a stem 43 may be provided with a portion 45 threaded to the cap, a head 47 at the inner end thereof, and a handle 49 at the outer end thereof. The construction is such that the handle may be rotated to draw the piston toward the cap and compress the spring between them. Then the cap may be removed to allow introduction of lubricant into the cylinder. Then the cap is screwed on to the cylinder and the handle is rotated to project the head 47 of the stem in advance of the piston as shown in Fig. 2 to permit the spring to move the piston toward the left of said figure and feed the lubricant therefrom.

Suitable means may be provided to conduct the lubricant through the cylinder to the bearing. In the present instance, for this purpose, the shaft is provided with an axial passage 51 having an open end adjacent the cylinder, and a port 53 extending from said passage transversely to the axis of the shaft and communicating with the journal box between the ball bearing and one of the leather rings. The construction is such that the lubricant will be forced from the cylinder through the passage 51 and port 53 to the journal box. The lubricant may fill the spaces at the opposite sides of the ball bearing, but it will be prevented from escaping inwardly or outwardly along the shaft by the leather rings, which as stated, intimately engage the shaft.

To allow air to escape from the journal box when the lubricant is introduced therein, the spacing ring 23 may have a port 55 therein, communicating with a circumferential groove 57 in the periphery of said spacing ring, said groove communicating in turn with a port 59 in the boss normally closed by a plug 61 tapped into said boss port. This plug may be removed while the lubricant is being forced into said chamber, but as soon as the lubricant commences to issue through the port 59, thereby indicating the journal box is filled with lubricant, the plug 61 may be screwed into said port to close the same.

The box and bearing at the opposite end of the motor may be similar to the construction described with the exception that in place of the head 9, a head 63 is provided secured by screw bolts 65 to the end of the boss 67. The passage 51 extends through the shaft to a port 69 communicating with the box in the boss 67. The construction is such that the cylinder 29 may serve to supply lubricant through the passage 51 and the ports in the shaft to both bearings.

When the lubricant supply cylinder is mounted in the head 9 and delivers lubricant around as well as into the end of the shaft, the cover plate 27 and the leather ring adjacent thereto, may be omitted, if desired. However, in such case the width of the spacing ring 25 would be increased sufficiently to enable it to transmit the clamping thrust from the head 9 to the bearing ring 11, the spacing ring 23 and the other leather ring.

Since the leather rings are thin, have merely small portions thereof in frictional engagement with the shaft, and large portions exposed to the cooling effect of the lubricant in the bearing boxes, there is no danger of overheating said rings.

It will be noted that the flanges of the inner leather rings project outward from the interior of the casing and are pressed into intimate engagement with the shaft, and prevent lubricant or water from working along the shaft to the interior of the casing. The lubricant at the ends of the flanges not only reduces the friction between the flange and the shaft, but also serves as an oil seal which contributes to the effectiveness of the flange in preventing water from passing along the shaft into the casing.

When the box is in the form of a boss integral with the casing and the shaft has one end inclosed within said boss by the head 9 carrying the lubricant supply cylinder, the connection of the head with the boss may be such that water cannot enter the box and work along the shaft. In such case, the inner leather ring may serve merely to prevent lubricant from escaping from the box into the casing. However, the inner leather ring in the box at the opposite end of the casing may serve the dual function of preventing both water and lubricant from entering the casing. This may be assisted by the outer leather ring which will also prevent the lubricant from escaping to parts located externally of the casing.

The construction described is simple and cheap in construction, and the parts thereof may be easily removed and replaced to permit cleaning and repair thereof.

While the invention has been described in its application to an electric motor, it will be understood that it is not limited thereto, but is readily applicable to bearings for shafts for other purposes.

It will be understood that the invention is not limited to the specific embodiment shown, but that various deviations may be made therefrom without departing from the spirit and scope of the appended claims.

What is claimed is:—

1. The combination with a shaft having a longitudinal passage therein, of a journal box for said shaft, ball bearing rings, one for said box, and the other for said shaft, balls between said rings, a pair of leather or equivalent rings tightly fitting said shaft at opposite sides of said bearing rings, spacing members between said bearing rings and leather rings, said shaft having a port connecting said passage with the space between said ball bearing rings and one of said leather rings, and means to force lubricant into said passage and thence through said port to said space.

2. The combination with a shaft, of a journal box therefor, a ball bearing member in said box, leather or equivalent rings formed for intimate engagement with said shaft, spacing members between said ball bearing and said rings, means to confine said ball bearing member, rings and spacing members against relative movement axially of the shaft, and means to supply lubricant to said box between said rings.

3. The combination with a shaft, of a journal box therefor, a bearing for said shaft in said box, a head for tightly closing an end of the journal box, a leather or equivalent ring within the box upon the side of the bearing away from said head and having a marginal portion flexed laterally from the plane of the ring toward said head and tensioned by such flexion to intimately engage said shaft to prevent leakage between it and the shaft, and means to supply lubricant to said bearing including a grease cup mounted upon said head, a piston in said cup, and means to move said piston to force said lubricant to said bearing.

4. The combination with a shaft, of a journal box therefor, a bearing for said shaft in said box, leather or equivalent rings within the box upon opposite sides of said bearing and constructed to intimately engage said shaft to prevent leakage between the shaft and said rings, a head for closing an end of the journal box, said head adapted to secure said rings in place, and means to supply lubricant to said bearing including a cylinder having a cap, a piston in said cylinder, spring means automatically to move said piston to force said lubricant to said bearing, and normally stationary means extending within said cylinder and manually movable to withdraw said piston from the cylinder.

5. The combination with a shaft, of journal boxes for said shaft, bearings mounted in said boxes, members at the inner sides of said bearings intimately engaging said shaft to prevent leakage between them, and means to supply lubricant to said boxes and bearings at the outer sides of said members.

6. The combination with a shaft, of a journal box therefor, a bearing in said box for said shaft, members at opposite sides of said bearing intimately engaging said shaft to prevent leakage between them, means to supply lubricant to said box, and means to permit air to escape from said box on introduction of lubricant therein.

7. The combination with members having bearing parts, one of said members being rotatable relative to the other, of a pair of rings at opposite sides of said bearing parts and having marginal portions flexed laterally toward each other and tensioned by such flexion intimately to engage the rotatable member at opposite sides of said bearing parts to prevent leakage of lubricant along said rotatable member beyond said rings, and means to admit lubricant to said bearing between said rings.

8. The combination with members having bearing parts, one of said members being rotatable relatively to the other, of a ring at one side of said bearing parts and having a marginal portion flexed laterally from the plane of said ring and tensioned by such flexion intimately to engage the rotatable member to prevent leakage of lubricant along said rotatable member beyond said ring, and means to admit lubricant to said bearing parts.

9. The combination with a casing having bosses projecting therefrom, of a shaft projecting through said bosses, bearing members for said shaft and bosses respectively, rings mounted in said bosses at opposite sides of said bearing members and having marginal portions flexed laterally and tensioned by such flexion intimately to engage the shaft at opposite sides of said bearing members, caps for closing the ends of said bosses, said shaft having an axial passage and ports extending from said axial passage to the interiors of said bosses, and lubricant supply means connected to one of said caps for supplying lubricant through the passage and ports of said shaft to the bearing members in said bosses.

In testimony whereof, I have signed my name to this specification.

MILTON A. FESLER.